United States Patent [19]

Lee et al.

[11] Patent Number: 5,828,647
[45] Date of Patent: Oct. 27, 1998

[54] DISK CHANGER WITH REDUCED DRIVING TIME

[75] Inventors: Young-Won Lee; Byoung-Yub Park; Sung-Yeon Park, all of Suwon, Rep. of Korea

[73] Assignee: Samsung Electronics Co., Ltd., Kyungki-Do, Rep. of Korea

[21] Appl. No.: 653,451

[22] Filed: May 24, 1996

[30] Foreign Application Priority Data

Jul. 7, 1995 [KR] Rep. of Korea ............ 95-19926
Jul. 21, 1995 [KR] Rep. of Korea ............ 95-21568

[51] Int. Cl.$^6$ .................................................. G11B 17/10
[52] U.S. Cl. ................................................... 369/192
[58] Field of Search ...................... 369/36, 75.1, 77.1, 369/178, 191, 192; 360/92, 98.04, 98.06

[56] References Cited

U.S. PATENT DOCUMENTS

| | | | |
|---|---|---|---|
| 4,479,210 | 10/1984 | Nakayama | 369/194 |
| 5,307,331 | 4/1994 | D'Alayer De Costemore D'Arc | 369/37 |
| 5,502,697 | 3/1996 | Taki | 369/34 |

*Primary Examiner*—Sturat S. Levy
*Assistant Examiner*—George J. Letscher
*Attorney, Agent, or Firm*—Sughrue, Mion, Zinn, Macpeak & Seas, PLLC

[57] ABSTRACT

A disk changer for shortening the time required for the extraction of a disk from a magazine portion and the performance of the recording/reproducing operation is provided. First and second extracting members for extracting a disk from the magazine portion, and first and second deck members including recording and reproducing elements thereon, are simultaneously moved to the vicinity of a selected disk. Then, the disk is extracted from the magazine portion, and the recording/reproducing operation is carried out. The recording/reproducing operation can also be performed with respect to a disk from outside the disk changer via a tray member.

26 Claims, 10 Drawing Sheets

DISK CHANGER WITH REDUCED DRIVING TIME

BACKGROUND OF THE INVENTION

The present invention relates to a disk changer comprising a magazine portion for receiving and storing a plurality of disks and a player portion for recording on/reproducing from a disk after extracting it from the magazine portion. More particularly, it relates to a disk changer in which the driving time required from the time of extracting the disk from the magazine portion to the time of recording on/reproducing from the extracted disk is shortened, the disk is stored without damage, and a disk can be directly inserted into the disk changer from outside the disk changer for a recording/reproducing operation.

Generally, as shown in FIG. 1, a disk changer comprises a magazine portion 10 for receiving and storing a plurality of disks, a player portion 20 for recording on/reproducing from a disk, and a transfer portion 30 for extracting a desired disk from the magazine portion 10 and transferring the extracted disk to the player portion 20.

A disk changer having the above structure generally operates as follows. First, the transfer portion 30 is transferred to a desired destination in the magazine portion 10 along a guide member 40 by the command of a user. The selected disk at the desired destination is extracted into the transfer portion 30. Then, the transfer portion 30 on which the extracted disk is loaded is transferred to the player portion 20. The player portion 20 performs the recording/reproducing operation with respect to the disk after the disk is loaded on the transfer portion 30.

As shown in FIG. 2, the magazine portion 10 uses a plurality of tray members 1. The tray members 1, on each of which a disk 2 is loaded, are slidably installed in the magazine portion 10 by transferring means (not shown) such as a rack and a pinion.

However, the above disk changer has the following problems.

First, it takes a long time to transfer the selected disk from the magazine portion 10 to the recording/reproducing position of the player portion 20. That is, the transfer portion 30 of the disk changer reciprocates between the position of the selected disk and the player portion 20, and the time required for this reciprocation is lengthy.

Second, when changing a disk in the magazine portion 10, the main body of the disk changer must be opened.

Third, when the reproduction of a disk other than a disk stored in the magazine portion 10 is intended, a disk stored in the magazine portion 10 must first be exchanged with the intended disk by opening the main body of the disk changer prior to the reproducing operation.

Fourth, an extracting device for extracting the tray member 1 from the magazine portion 10 to move the disk 2 onto the transfer portion 30 is required, thus complicating the structure of the disk changer.

Fifth, since the loaded disk 2 is stored on the tray member 1, a recording surface of the disk can be damaged.

SUMMARY OF THE INVENTION

To solve the above problems, it is an object of the present invention to provide a disk changer in which disk transfer time from a magazine portion to a player portion is shortened and a recording/reproducing operation can be easily performed on a disk from outside the disk changer.

It is another object of the present invention to provide a disk changer having a magazine portion with an improved structure, in which a plurality of disks can be stored without damage to their surfaces.

To achieve the above objects, there is provided a disk changer comprising: a magazine portion for storing a plurality of disks; a deck member provided with a turntable on which the disk is seated, and an optical pickup; a second stage for supporting the deck member; a tray member slidably installed on the deck member for transferring a disk from outside the disk changer; first moving means for slidably moving the tray member; a first stage for supporting the second stage; a clamp member supported by the first stage for clamping the disk loaded on the turntable; first ascending/descending means for raising and lowering the deck member with respect to the second stage to clamp the disk using the clamp member and release the disk from the clamp member; second ascending/descending means for raising and lowering the first stage with respect to the disks in the magazine portion; and means for extracting a disk from the magazine portion and seating the extracted disk on the turntable.

In the above disk changer according to the present invention, the first moving means comprises a first rack gear portion formed in one side of the tray member; a first motor installed on the deck member; and a gear train driven by the first motor and in mesh with the first rack gear portion of the tray member.

The first ascending/descending means comprises a plurality of guide slots formed slantingly at a predetermined angle on both sides of the second stage; a fixing plate having vertical slots placed between the second stage and the deck member and fixed to the first stage; a plurality of guide pins formed on one side of the deck member and slidably coupled with the guide slots and the vertical slots, respectively; and second moving means for laterally moving the second stage.

The second ascending/descending means comprises a third motor installed on the first stage; first and second brackets adjacent to opposite sides of the first stage, each having a pair of third rack gear portions arranged parallel to the plurality of disks stored in the magazine portion; first and second supporting shafts for supporting the first stage, each having a pinion gear at each end which meshes with the third rack gear portions of the first and second brackets are connected; a connecting gear for connecting at least one of the pinion gears with the third motor; and a timing belt for connecting the first and second supporting shafts.

The disk extracting means comprises a slide member which is slidably installed on the first stage; third moving means for moving the slide member in the disk inserting/extracting direction; first and second extracting levers for gripping the edge of a disk stored in the magazine portion, which are movable in opposite directions to each other; and fourth moving means for moving the first and second extracting levers.

The third moving means comprises a guide bar installed on the first stage, to which one side of the slide member is slidably coupled; a fourth rack gear portion formed on the first stage parallel to the guide rail; a fourth motor installed on the slide member; and a pinion gear connected to the fourth motor and in mesh with the fourth rack gear portion. Auxiliary guide means for guiding the other side of the slide member are further provided. The auxiliary guide means comprises a guide plate fixed to the upper edge of the second stage; a support plate fixed to the other side of the slide member; and a guide roller rotatably installed on the support plate and guided by the guide plate.

The fourth moving means comprises guide slots formed in the first and second extracting levers; a plurality of guide pins formed on the slide member and coupled with the guide slots; a fifth motor installed on the slide member; a cam gear having a cam slot of a predetermined shape, installed on the slide member, and rotated by the fifth motor; a cam pin formed on the first extracting member and coupled to the cam slot; and means for transmitting power from the fifth motor to the second extracting lever.

The magazine portion comprises a pair of gripping levers for gripping the edge of the stored disks, which are rotatably installed between arc-shaped slits; and a pair of spring members for elastically biasing the pairs of gripping levers toward the center of the disk, respectively.

According to the disk changer of the present invention, the deck member as a recording/reproducing portion, and the first and second extracting members, for extracting a disk from the magazine portion, are simultaneously moved, so that operation time is shortened.

Also, the disk changer of the present invention comprises an additional tray member, so that the recording/reproducing operation can be performed on a disk received from outside the disk changer; that is, a disk other than a disk stored in the magazine portion.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
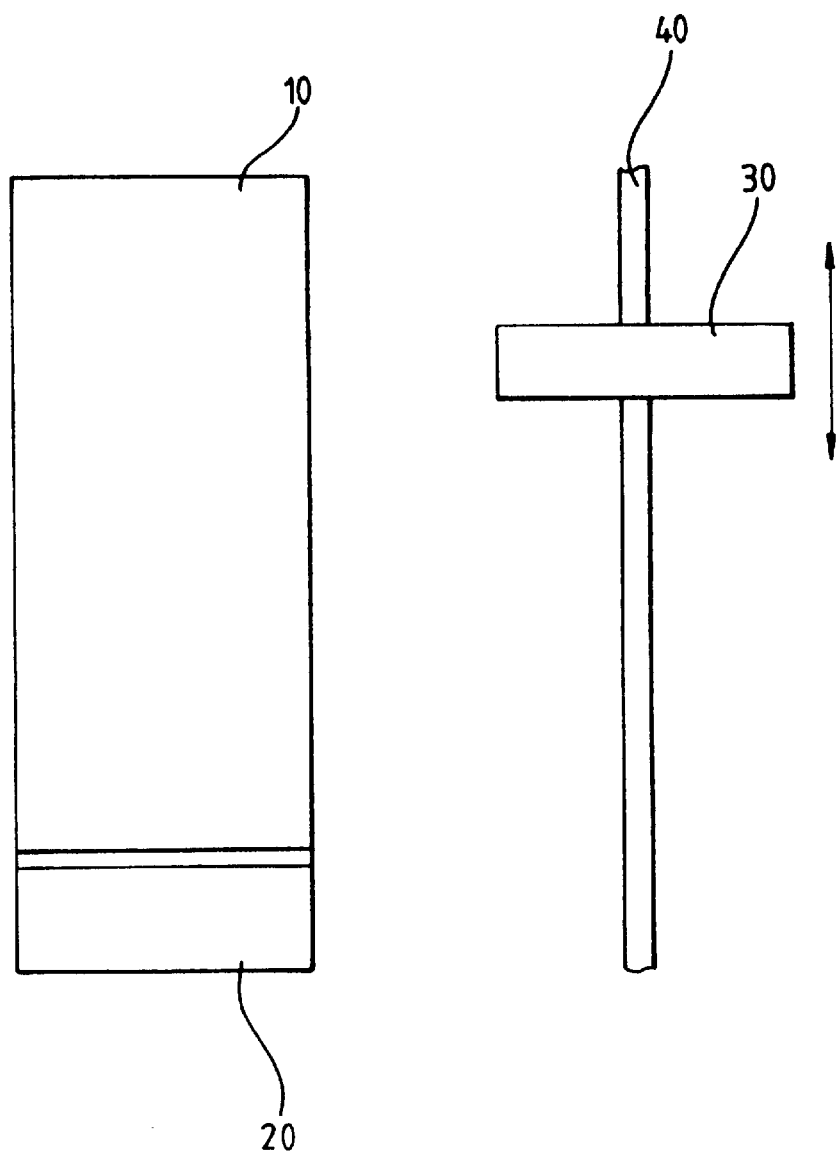
FIG. 1 is a diagram schematically showing a conventional disk changer.
Figure 2:
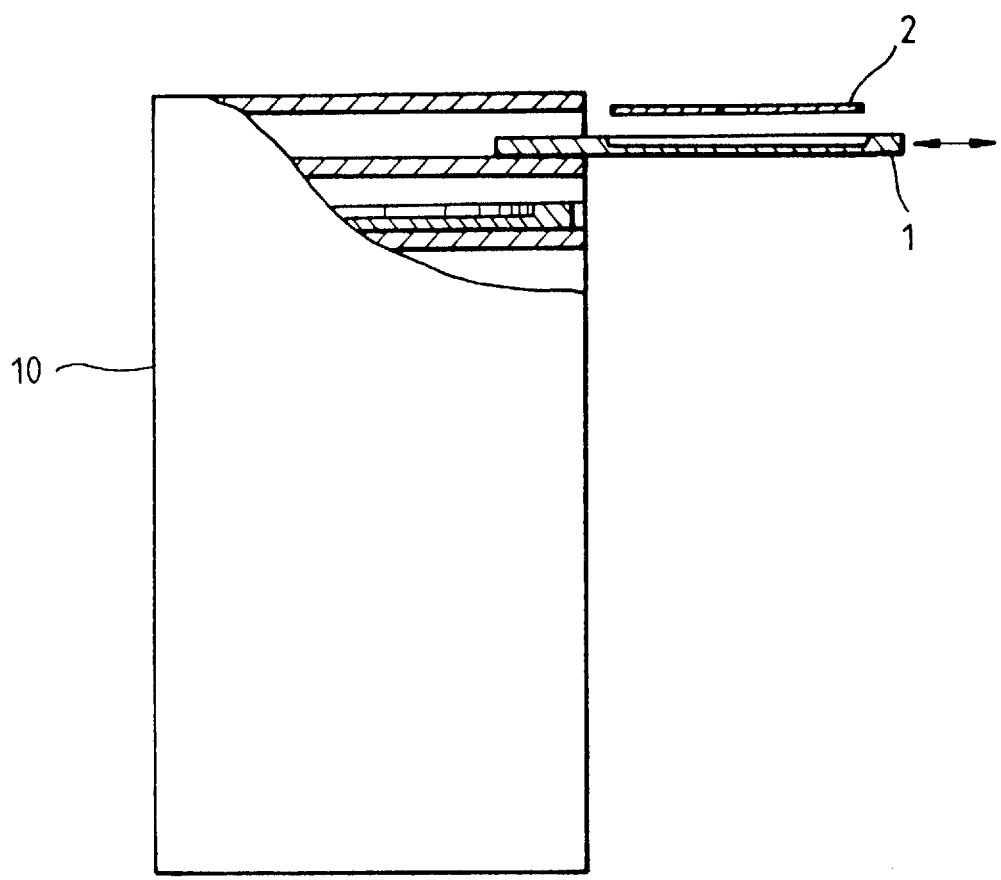
FIG. 2 is a diagram schematically showing the disk magazine portion of the conventional disk changer.
Figure 3:
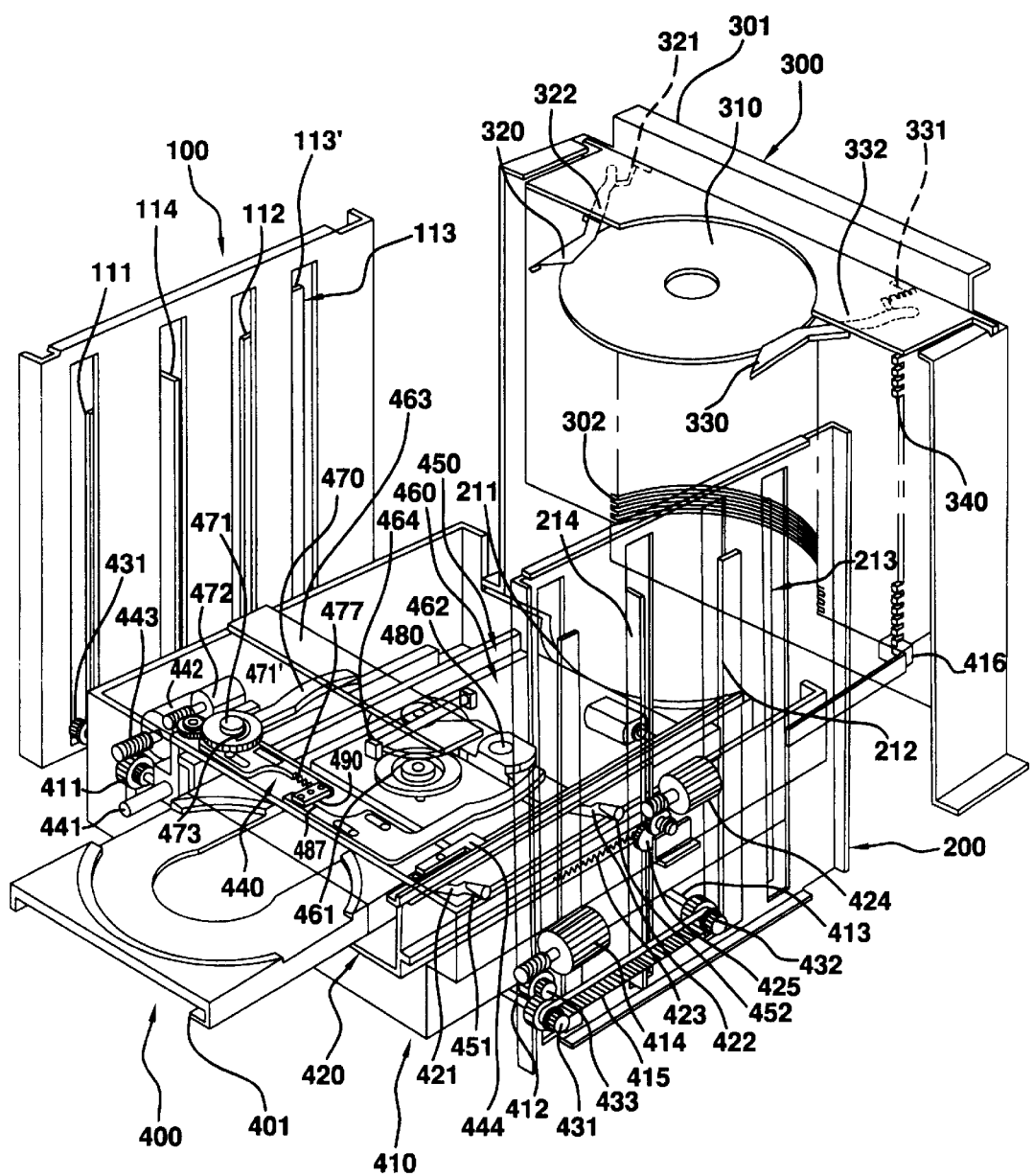
FIG. 3 is a perspective view showing a disk changer according to the present invention.

Referring to FIG. 3, a disk changer according to the present invention comprises a magazine portion 300 for receiving and storing a plurality of disks 310, and a second deck member 460 having a turntable 461 on which the disk 310 is to be seated and a recording/reproducing element such as an optical pickup 462.

Also, there is provided a first deck member 450 for supporting the second deck member 460, a second stage 420 for supporting the first deck member 450, a tray member 400 which is slidably mounted to the first deck member 450 for transferring a disk from the outside, a first moving means for slidably moving the tray member 400, a first stage 410 for supporting the second stage 420, and a clamp member 464 which is supported by the upper end of the first stage 410 for clamping the disk 310 seated on the turntable 461.

Also, there are provided a first ascending/descending means for raising and lowering the first and second deck members 450 and 460 with respect to the second stage 420 so as to clamp the disk 310 using the clamp member 464 and release the disk 310 from the clamp member 464, a second ascending/descending means for raising and lowering the first stage 410 with respect to the disk 310 in the magazine portion 300, and a disk extracting means for extracting a disk 310 from the magazine portion 300 and loading the extracted disk 310 on the turntable 461.

Figure 10:
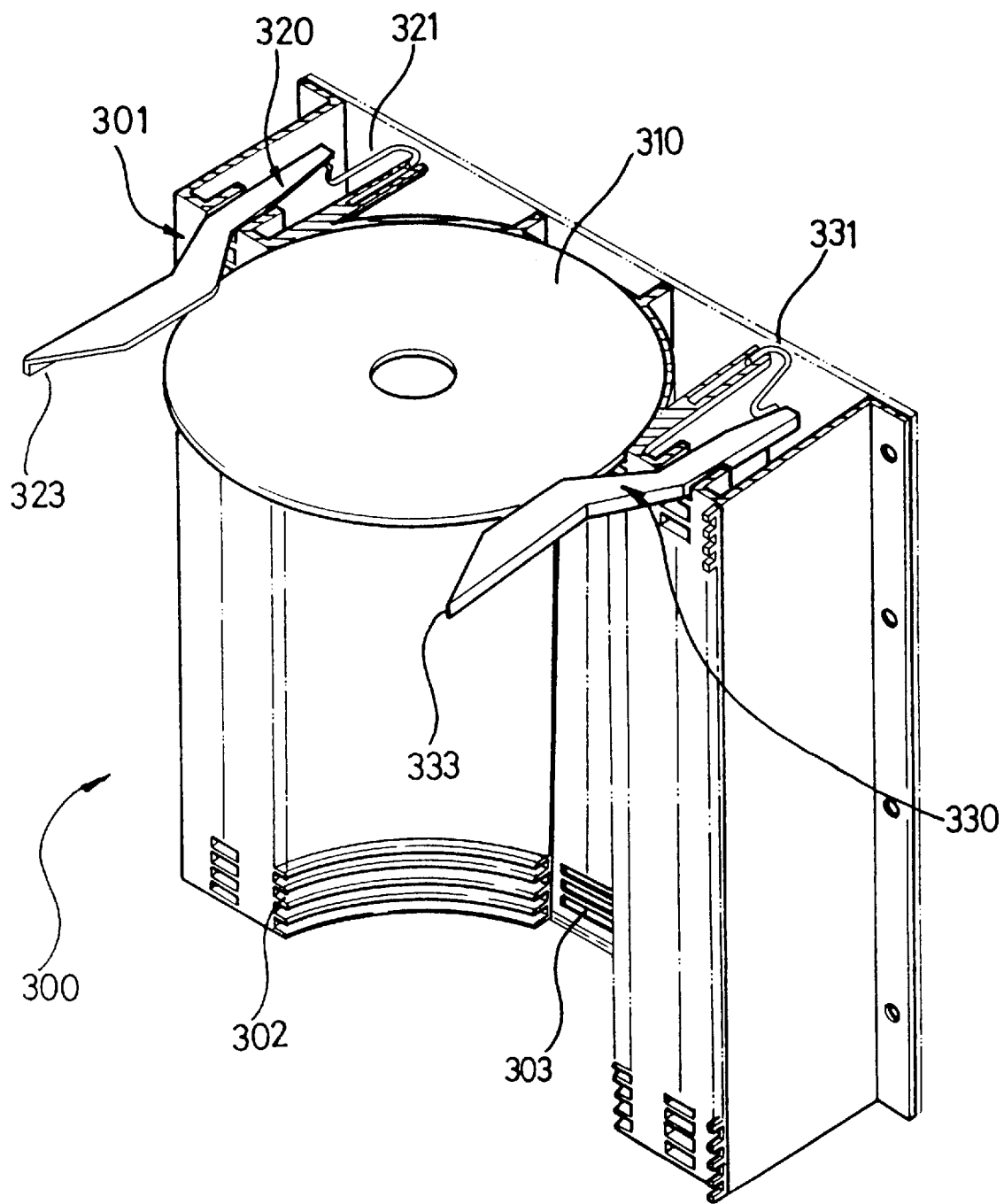
FIG. 10 is a perspective view of a magazine portion of the disk changer according to the present invention.
Figure 11:
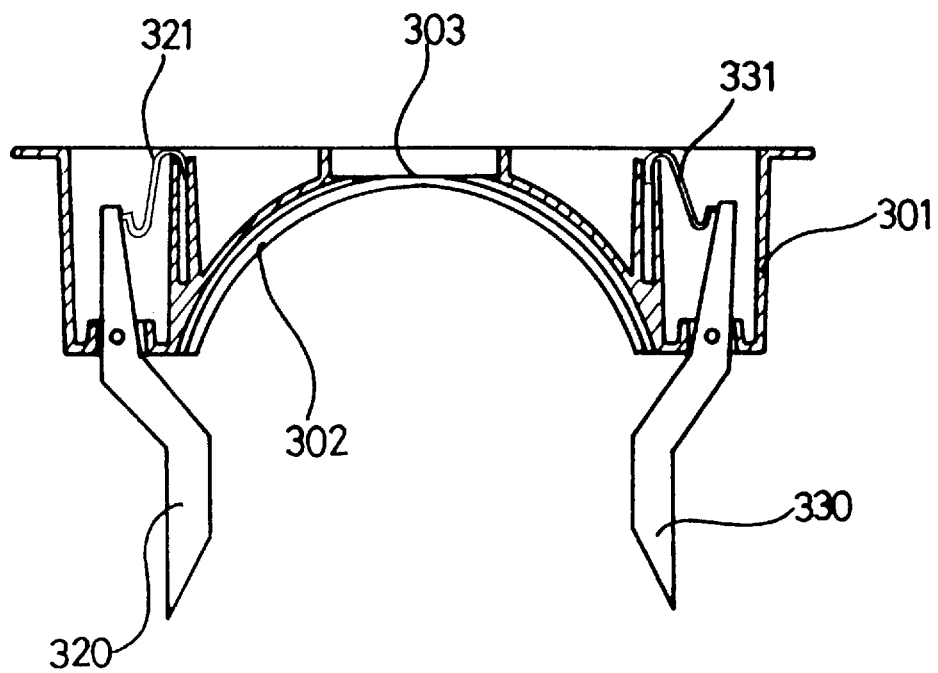
FIG. 11 is a schematic plan view of the magazine portion shown in FIG. 10.
Figure 12:
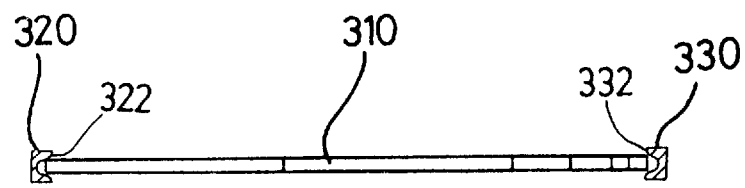
FIG. 12 is a cross-sectional view of a disk which is fixed by the gripping levers.

Referring to FIGS. 3, 10 and 11, in the magazine portion 300 there is installed a disk storing member 301 having a plurality of arc-shaped slits 302, sequentially stacked, into which plural disks 310 are inserted, and plural pairs of gripping levers 320 and 330 for gripping the received and stored disks 310. In the gripping levers 320 and 330 are rotatably installed centering pins 322 and 332 (see FIG. 3) set on a body of the magazine portion 300. Each pair of the gripping levers 320 and 330 are elastically biased by the spring members 321 and 331 so as to elastically grip the edge of the disk 310. Also, arc-shaped grooves 323 and 333 (see FIG. 8) into which the edge of the disk is partially inserted are formed at each pair of the gripping levers 320 and 330, respectively. The arc-shaped grooves 323 and 333 may be formed with a trapezoidal (see FIG. 12), circular or elliptical cross-section. Thus, when the disk 310 is gripped by the gripping levers 320 and 330, only the edge of disk 310 contacts each gripping lever, so that the recording surface of the disk is protected.

Also, a supporting slot 303 for supporting the disk 310 is partially formed at each slit 302, wherein the disk 310 is supported by being partially inserted thereunto, so that the disk can be positively received and stored in the magazine portion 300.

In the second deck member 460, the turntable 461 on which the disk 310 is loaded and the recording/reproducing element, such as optical pickup 462 for irradiating an optical beam on the disk 310, are installed. In the first deck member 450 for supporting the second deck member 460, the elements of the first moving means are installed.

Figure 4:
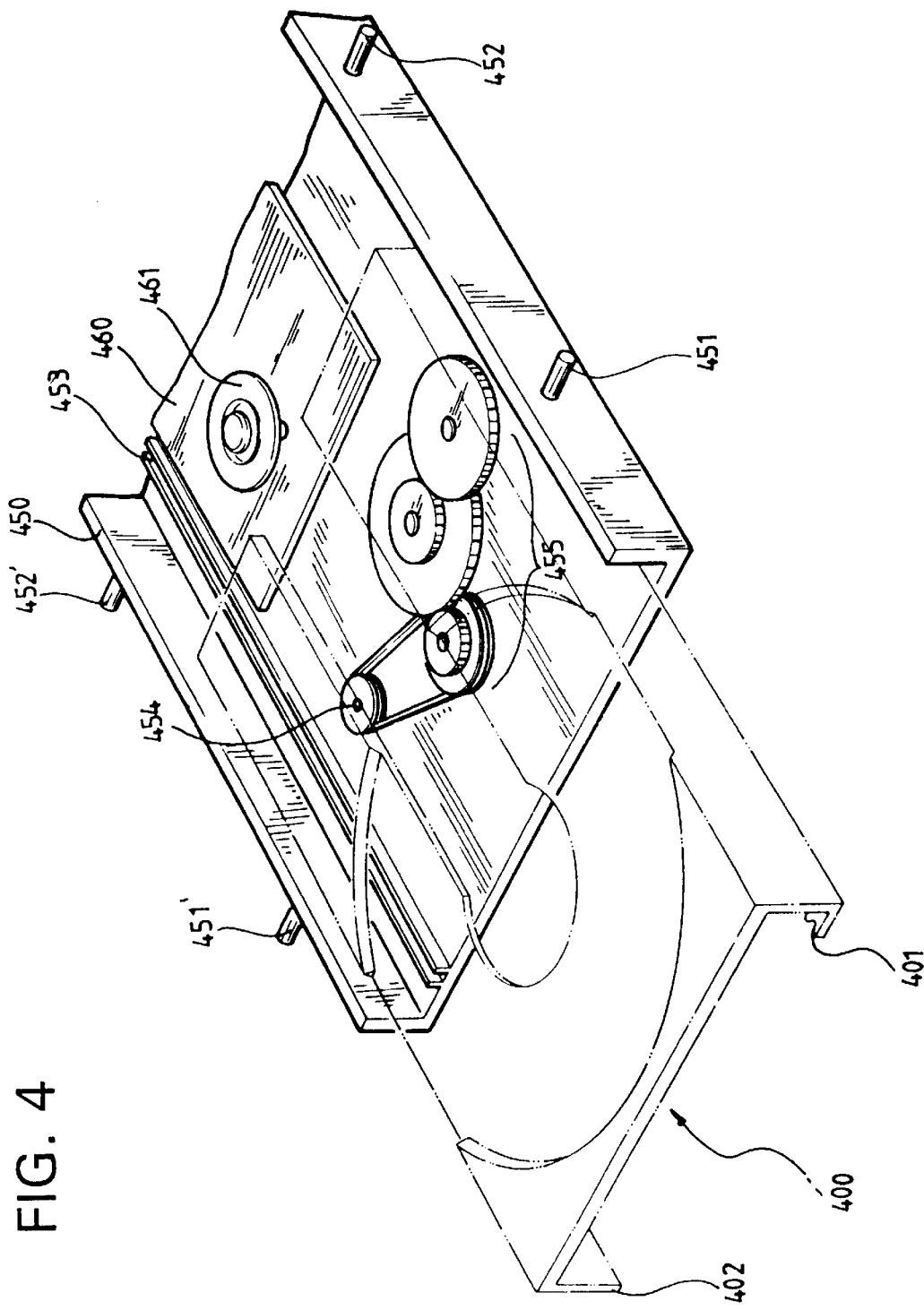
FIG. 4 is a perspective view illustrating the moving operation of a tray member.

The first moving means for moving the tray member 400 is constructed as follows. Referring to FIGS. 3 and 4, a rack gear portion 401 is formed on one side of the tray member 400. In the first deck member 450, there are installed a first motor 454 for generating driving power and a gear train 455 which is rotated by the first motor 454 while being meshed with the rack gear portion 401 of the tray member 400.

A guiding means for guiding the other side of the tray member 400 is comprised as follows. Referring to FIG. 4, a guide 402 is formed on the other side of the tray member 400 and a guiding rail 453 for guiding the guide 402 of the tray member 400 is formed on the first deck member 450.

Thus, the tray member 400 reciprocates from the turntable 461 to the outside of the disc changer using the power of the first motor 454, and the tray member 400 moves smoothly because of the guiding means.

Figure 5:
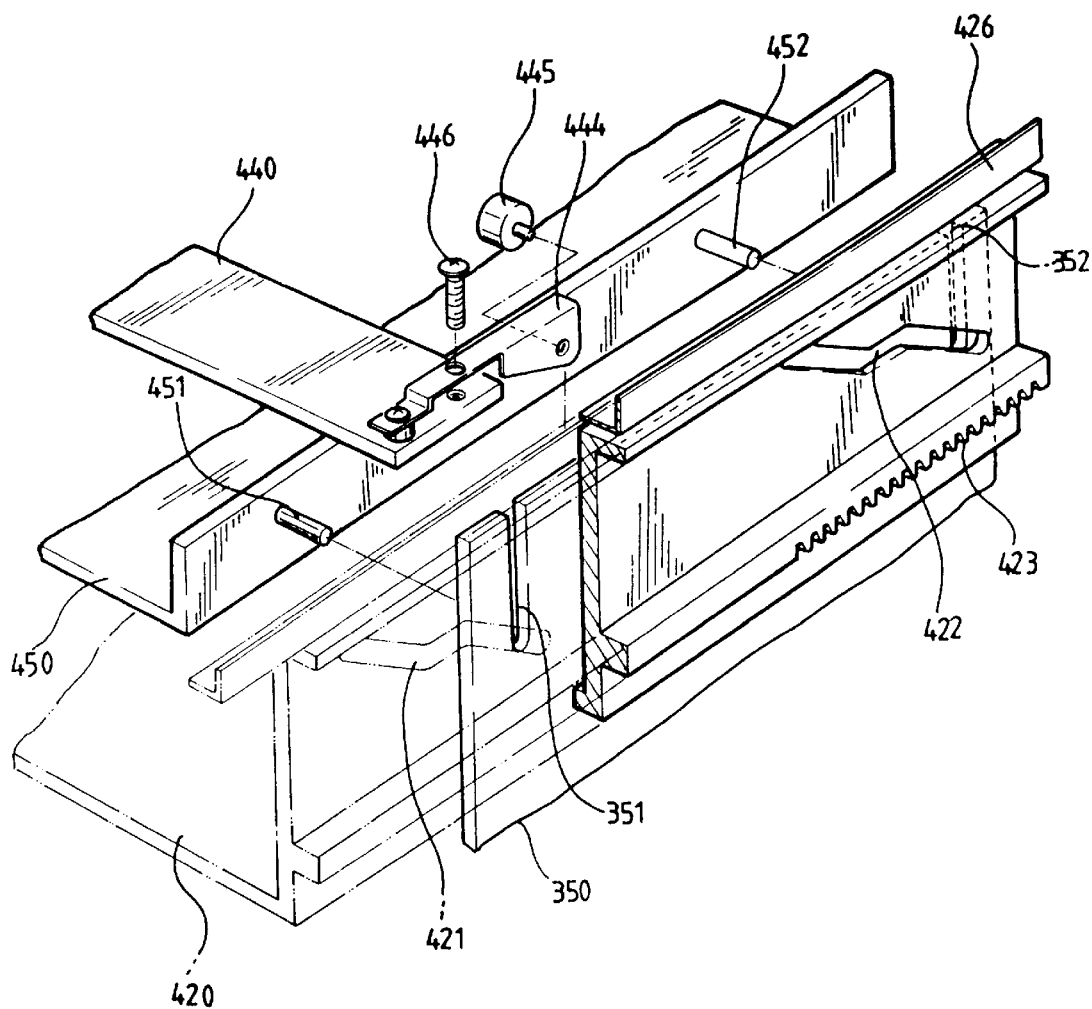
FIG. 5 is a perspective view illustrating the ascending/descending operation of a deck member and the guiding operation of a slide member.
Figure 9:
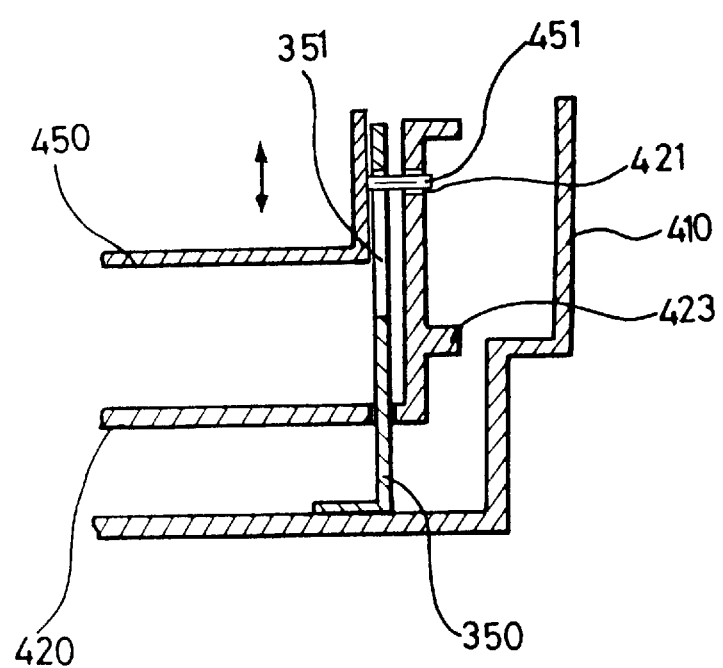
FIG. 9 is a cross-sectional view illustrating the ascending/descending operation of the deck member.

The first ascending/descending means for raising and lowering the first and second deck members 450 and 460 is constructed as follows. Referring to FIGS. 3, 5 and 9, a plurality of guide slots 421 and 422 slanted at a predetermined angle are formed on the side of the second stage 420. Here, these guide slots are symmetrically formed on both sides of the second stage 420. Also, a fixing plate 350 formed with vertical slots 351 and 352 corresponding to the guide slots 421 and 422 is placed between the first deck member 450 and the second stage 420. The fixing plate 350 is fixed on the first stage 410. A plurality of guide pins 451 and 452 slidably coupled with the guide slits 421 and 422 and the vertical slots 351 and 352, respectively, are formed in both sides of the first deck member 450. These guide pins are symmetrically formed in both sides of the first deck member 450.

The first ascending/descending means also comprises a second moving means for horizontally moving the second stage 420. The second moving means is constructed as follows. Referring to FIG. 3, a rack gear portion 423 with a predetermined length is formed on the side of the second stage 420. Also, a second motor 424 for generating driving power and a pinion 425 which is rotated by the second motor 424 in mesh with the rack gear portion 423 are installed in the side of the first stage 410.

Thus, the second stage 420 can be horizontally moved by the second motor 424, so that the first and second deck members 450 and 460 can ascend or descend. As a result, the disk 310 loaded on the turntable 461 can be clamped by the clamp member 464 or released from clamping. The clamp member 464 is installed on a support 463 installed on the first stage 410.

The second ascending/descending means for raising and lowering the first stage 410 with respect to the disk 310 in the magazine portion 300 is constructed as follows. The second ascending/descending means raises and lowers the first and second deck members 450 and 460 together with the first and second stages 410 and 420. Referring to FIG. 3, first and second brackets 100 and 200 having vertical rack gear portions 111, 112 and 211, 212, respectively, are provided adjacent to opposite sides of the first stage 410. First and second supporting shafts 412 and 413, having pinion gears 431 and 432 at both ends, are rotatably installed in the bottom of the first stage 410. Pinion gears 431 and 432 mesh with the rack gear portions 111 and 112 of the first bracket 100 and the rack gear portions 211 and 212 of the second bracket 200. Also, a third motor 414 generating driving power and a connecting gear 433 for transmitting the power from the third motor 414 to the first supporting shaft 412 are installed in the side of the first stage 410. The first and second supporting shafts 412 and 413 are connected by a timing belt 415.

Figure 6:
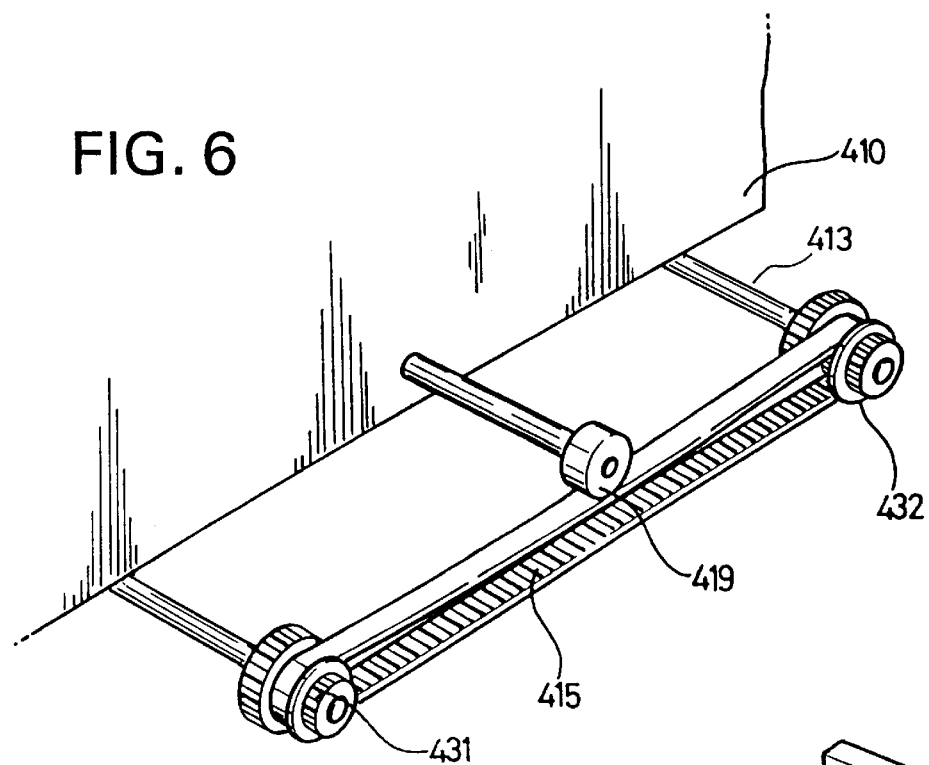
FIG. 6 is a perspective view of a driving portion for raising and lowering the first stage.

As shown in FIG. 6, a tension roller 419 for pressing the timing belt 415 is installed in the side of the first stage 410. The tension roller 419 provides a predetermined tension to the timing belt 415 so as to smoothly transmit the power from the third motor 414 to the second supporting shaft 413.

Further, a guiding means for preventing the oscillation of the first stage 410 when the first stage 410 ascends/descends is provided.

Figure 7:
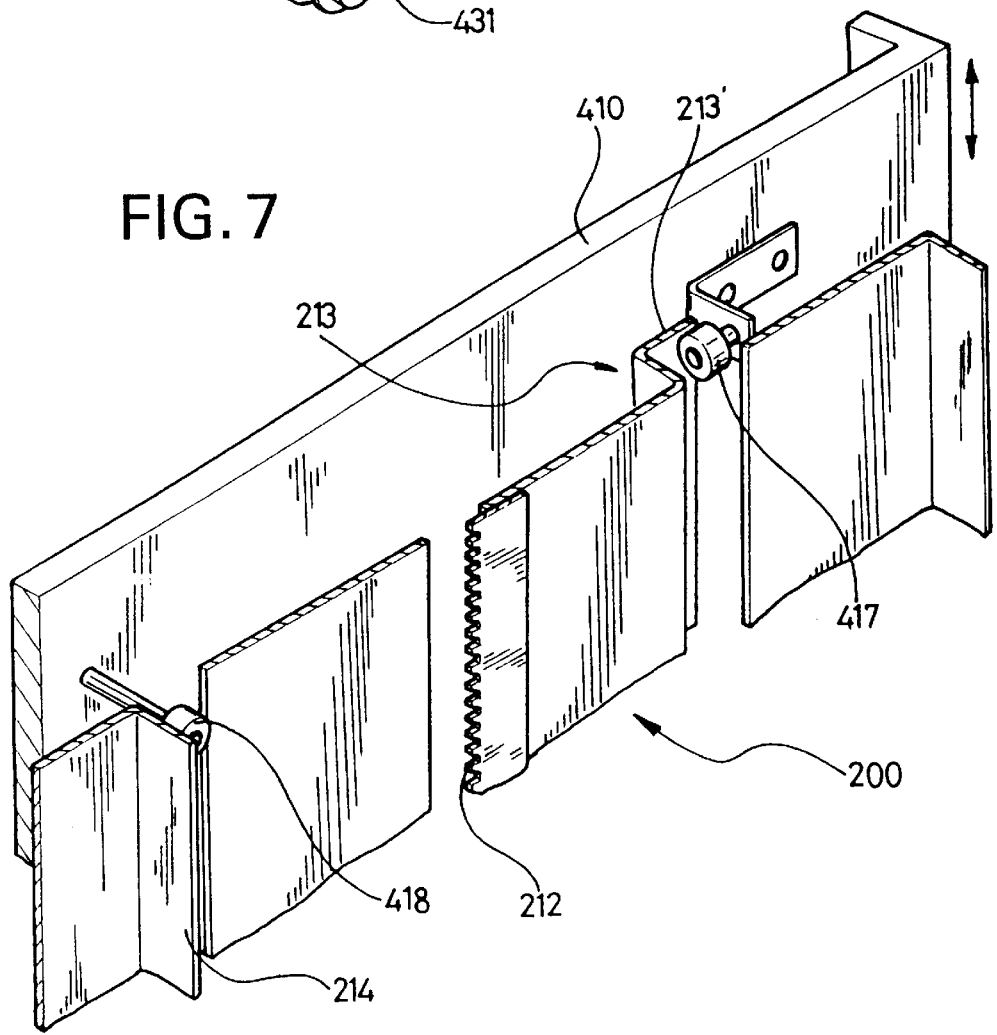
FIG. 7 is a perspective view of a guide means when the first stage ascends/descends.

As shown in FIGS. 3 and 7, the guiding means comprises first guide members 113 and 213 each having guide portions 113' and 213' formed in the first and second brackets 100 and 200 in parallel with the first stage 410, second guide members 114 and 214 which are formed perpendicular to the first and second brackets 100 and 200, first guide rollers 417 which are rotatably attached to both sides of the first stage 410 and guided by the first guide members 113 and 213, and second guide rollers 418 which are rotatably attached to both sides of the first stage 410 and guided by the second guide members 114 and 214.

Figure 8:
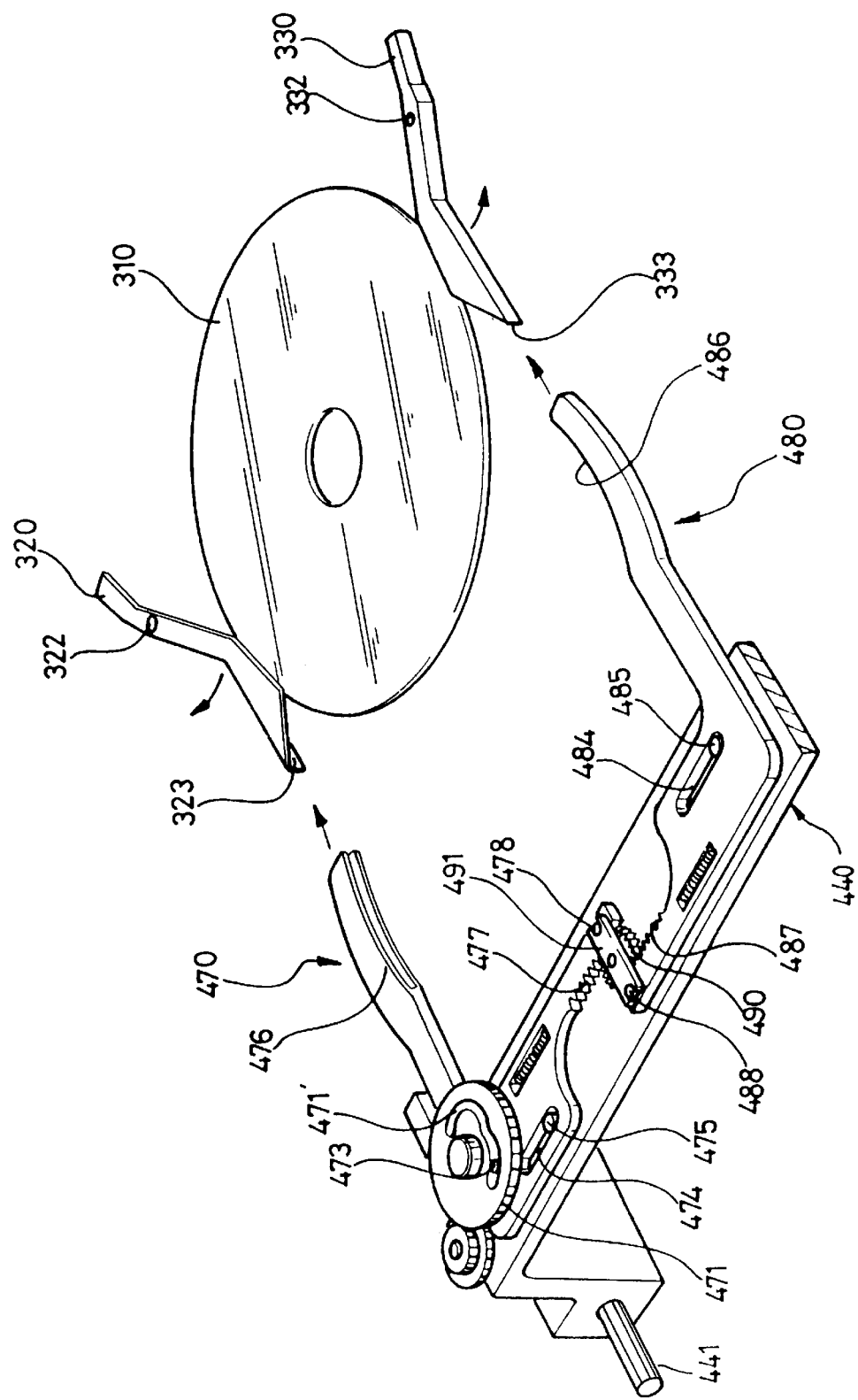
FIG. 8 is a perspective view illustrating the extracting operation of a disk.

The disk extracting means is constructed as follows. Referring to FIGS. 3 and 8, a slide member 440 is installed on the first stage 410, to slide in the disk inserting/extracting direction by a third moving means. Also, a pair of first and second extracting levers 470 and 480 for gripping the edge of the disk 310 are installed on the slide member 440, which can move in opposite directions from each other by a fourth moving means. The first and second extracting levers 470 and 480 have arc-shaped grooves 476 and 478 into which the edge of the disk 310 is inserted.

The third moving means comprises a guide bar 441 installed in one side of the first stage 410, and to which one side of the slide member 440 is slidably coupled, a rack member 411 which is attached to the first stage 410 parallel to the guide bar 441, a fourth motor 442 attached to the slide member 440, and a pinion 443 which is attached to the side of the first stage 410 and connected to the fourth motor 442 while being engaged with the rack member 411. Thus, the slide member 440 slides when the fourth motor 442 turns.

An auxiliary guide means is further provided at the other side of the slide member 440. As shown in FIGS. 3 and 5, the auxiliary guide means comprises a guide plate 426 which is fixed to the upper edge of the second stage 420, a support plate 444 which is fixed on the slide member 440 by an adjustment screw 446, and a guide roller 445 rotatably installed on the support plate 444 guided by the guide plate 426.

The fourth moving means for moving the first and second extracting levers 470 and 480 in opposite directions from each other is constructed as follows. Referring to FIGS. 3 and 8, guide slots 474 and 484 are formed in the first and second extracting levers 470 and 480, respectively, and a plurality of guide pins 475 and 485 coupled with the guide slots 474 and 484 are formed on the slide member 440. Also, in the slide member 440, there are installed a fifth motor 472 and a cam gear 471 having a cam slot 471' of a predetermined shape, which is rotated by the fifth motor 472. A cam pin 473 coupled with cam slot 471' is formed on the first extracting lever 470. In addition, a connecting means for transmitting the power of the fifth motor 472 to the second extracting lever 480 is provided.

The connecting means is constructed as follows. Referring to FIG. 8, rack gear portions 477 and 487 are formed on the end of each of the first and second extracting levers 470 and 480, and a connecting gear 490 for connecting the rack gear portions 177 and 187 is installed on the slide member 440. Thus, when the first extracting lever 470 is moved laterally by the rotation of the cam gear 471, the second extracting lever 480 moves in the opposite direction by the rotation of the connecting gear 490.

A connecting lever 491 is installed on a rotation shaft of the connecting gear 490, and guide pins 478 and 488 for guiding each end of the connecting lever 491 are formed on the first and second extracting levers 470 and 480, respectively.

Referring to FIG. 3, a sensor member 416 is installed on one end of the first stage 410 toward the inside thereof. Also, a slit portion 340 having a plurality of slits arranged at a predetermined distance is installed in the magazine portion 300. Each slit of the slit portion 340 is formed corresponding to each receiving and storing position of a disk 310. As a result, the sensor member 416 counts the number of slits of the slit portion 340 while moving together with the first stage 410, so that the position of an intended disk 310 can be detected.

Hereinafter, the operation of the above-described disk changer according to the present invention will be described.

When a disk 310 is selected by a user, the third motor 414 rotates the timing belt 415. While the first and second supporting shafts 412 and 413 supporting first stage 410 rotates, the first stage 410 moves along the rack gear portions 111, 112 and 211, 212 formed in the first and second brackets 100 and 200. Here, as shown in FIG. 7, the first stage 410 can ascend/descend without oscillation since the first and second guide members 213 and 214 guide the first and second guide rollers 417 and 418. When the sensor member 416 detects the location of the selected disk by counting the number of slits during the movement of the first stage 410, the third motor 414 stops.

Subsequently, the fourth motor 442 operates to move the slide member 440 toward the magazine portion 300. One side of the slide member 440 is guided along the rack gear portion 411 and the guide bar 441, and the other side of the slide member 440 is guided by the guide roller 445 installed on the slide member 440 and guided along the guide plate 426 installed on the second stage 420. Here, the compressing force of the guide roller 445 with respect to the guide plate 426 can be adjusted by the adjustment screw 446.

As the slide member 440 moves to the desired disk 310 above, the first and second extracting levers 470 and 480 are inserted between the gripping levers 320 and 330 and disk 310 as shown in FIG. 8. Each of the gripping levers 320 and 330 is rotated by the inserting force of the first and second extracting levers 470 and 480, thereby releasing their grip on the disk 310. Simultaneously, the first and second extracting levers 470 and 480 grip the disk 310. As a result, the disk 310 is positively inserted into the arc-shaped grooves 476 and 486 of the first and second extracting levers 470 and 480.

After the first and second extracting levers 470 and 480 grip the disk 310, the fourth motor 442 moves the slide member 440 in the opposite direction. When the disk 310 gripped by the first and second extracting levers 470 and 480 is located above the turntable 461, the fourth motor 442 stops.

Thereafter, referring to FIGS. 3 and 8, the fifth motor 472 rotates the cam gear 471. By the rotation of the cam gear 471, the first extracting lever 470 moves outward and simultaneously the second extracting lever 480 moves outward. As a result, the disk 310 is released from the first and second extracting levers 470 and 480, thereby being seated on the tray member 400.

Then, referring to FIGS. 3, 5 and 9, the second motor 424 drives the second stage 420 toward the magazine portion 300. Here, the first deck member 450 ascends while being guided by the vertical slots 351 and 352 of the fixing plate 350 and the guide slots 421 and 422 of the second stage 420. As a result, the disk 310 loaded on the tray member 400 is clamped by the clamping member 464 and simultaneously loaded on to the turntable 461. The recording/reproducing operation is then performed on the disk 310.

It is preferable that the disk 310 be loaded on the turntable 461 from the first and second extracting levers 470 and 480 after the first and second deck members 450 and 460 move to the middle points in the guide slots 421 and 422 of the second stage 420.

After completing the recording/reproducing operation on the disk 310, the movement of the disk 310 from the turntable 461 to the magazine portion 300 can be performed in the inverse sequence of the above operation.

When performing the recording/reproducing operation with a disk provided from outside the disk changer (other than a disk stored in the magazine portion 300), the operation is as follows.

Referring to FIG. 4, the tray member 400 is moved toward the outside of the disk changer by a predetermined distance by the first motor 454 and then stops. Then, after loading an intended disk on the tray member 400, the tray member 400 is moved back inside by the inverse rotation of the first motor 454. Thereafter, while the turntable 461 ascends by the operation of the first ascending/descending means, the disk is clamped by the clamping member 464 and simultaneously loaded on the turntable 461.

When exchanging a disk 310 stored in the magazine portion 300 with a disk from outside the disk changer, the following operation is performed.

First, the first stage 410 moves to a predetermined position of the magazine portion 300, in which an intended disk is stored, by the second ascending/descending means. Then, the disk 310 is extracted in the same manner as described above and then seated on the tray member 400. Thereafter, the first stage 410 is lowered by the second ascending/descending means and the tray member 400 is moved toward the outside of the disk changer by the first moving means. The disks are exchanged and then the disk provided from outside is stored in the magazine portion 300 according to the opposing sequence of the above operation.

As described above, the disk changer according to the present invention has the following advantages.

First, the disks 310 stored in the magazine portion 300 can be easily exchanged with each other using the tray member 400.

Second, a disk other than a disk stored in the magazine portion 300 can be recorded/reproduced by using the tray member 400.

Third, the disk extracting means for extracting the disk from the magazine portion 300 and the first and second deck members 450 and 460 for recording/reproducing the extracted disk can move simultaneously, thereby shortening operation time.

Fourth, unlike the conventional disk changer which requires a tray extracting device, in the disk changer of the present invention the disk 310 is received and stored by the gripping levers 320 and 330, so that the disk can be easily extracted without an additional tray extracting device.

Fifth, the gripping levers 320 and 330 grip the edge of the disk 310, so that the disk can be received and stored without damage to the recording surface thereof.

What is claimed is:

1. A disk changer comprising:
 a magazine portion for storing a plurality of disks;
 a deck member having a turntable, on which one of said disks is seated, and including a recording/reproducing element;
 a second stage for supporting said deck member;
 a tray member slidably mounted on said deck member for loading a disk from outside said disk changer;
 first moving means for slidably moving said tray member;
 a first stage for supporting said second stage;
 a clamp member supported by said first stage for clamping said disk seated on said turntable;
 first ascending/descending means for raising and lowering said deck member with respect to said second stage to clamp said disk using said clamp member and release said disk from said clamp member, and second moving means for laterally moving and second stage;

second ascending/descending means for raising and lowering said first stage with respect to said plurality of disks in said magazine portion; and means for extracting one of said plurality of disks from said magazine portion and seating the extracted disk onto said turntable.

2. A disk changer as claimed in claim 1, wherein said first moving means comprises:

a first rack gear portion formed in one side of said tray member;

a first motor mounted on said deck member; and a gear train driven by said first motor and in mesh with said first rack gear portion of said tray member.

3. A disk changer as claimed in claim 2, said first moving means further comprising means for guiding the other side of said tray member.

4. A disk changer as claimed in claim 3, wherein said guiding means comprises:

a guide formed on the other side of said tray member; and a guiding rail formed on said deck member, for guiding said guide.

5. A disk changer as claimed in claim 1, wherein said first ascending/descending means further comprises:

a plurality of guide slots formed slantingly at a predetermined angle on opposite sides of said second stage;

a fixing plate having vertical slots, placed between said second stage and said deck member and fixed to said first stage; and a plurality of guide pins formed on opposite sides of said deck member and slidably coupled with said guide slots and said vertical slots, respectively.

6. A disk changer as claimed in claim 5, wherein said second moving means comprises:

a second rack gear portion formed on one side of said second stage;

a second motor mounted on said first stage; and a pinion gear rotated by said second motor and in mesh with said second rack gear portion.

7. A disk changer as claimed in claim 1, wherein said second ascending/descending means comprises:

a third motor mounted on said first stage;

first and second brackets adjacent to opposite sides of said first stage, each having a pair of third rack gear portions arranged parallel to said plurality of disks stored in said magazine portion;

first and second supporting shafts for supporting said first stage, each having a pinion gear at each end, said pinion gears being enmeshed with said third rack gear portions of said first and second brackets;

a connecting gear for connecting at least one of said pinion gears with said third motor; and a timing belt for connecting said first and second supporting shafts.

8. A disk changer as claimed in claim 7, wherein a tension roller for pressing said timing belt is attached to said first stage.

9. A disk changer as claimed in claim 7, further comprising means for preventing the oscillation of said first stage when said first stage ascends/descends.

10. A disk changer as claimed in claim 9, wherein said oscillation preventing means comprises:

first guide members attached to said first and second brackets, respectively, each having guide portions which are parallel to said first and second brackets;

second guide members attached to said first and second brackets, respectively, each having guide portions which are perpendicular to said first and second brackets;

a pair of first guide rollers rotatably mounted to both sides of said first stage and guided by said first guide member; and a pair of second guide rollers rotatably mounted to both sides of said first stage and guided by said second guide member.

11. A disk changer as claimed in claim 1, wherein said disk extracting means comprises:

a slide member slidably mounted on said first stage;

third moving means for moving said slide member in the disk inserting/extracting direction;

first and second extracting levers for gripping an edge of one of said plurality of disks, said extracting levers mounted on said slide member and movable in opposite directions towards and away from each other; and fourth moving means for moving said first and second extracting levers.

12. A disk changer as claimed in claim 11, wherein said third moving means comprises:

a guide bar attached to said first stage, to which one side of said slide member is slidably coupled;

a fourth rack gear portion formed on said first stage parallel to said guide rail;

a fourth motor installed on said slide member; and a pinion gear connected to said fourth motor and in mesh with said fourth rack gear portion.

13. A disk changer as claimed in claim 12, further comprising auxiliary guide means for guiding the other side of said slide member.

14. A disk changer as claimed in claim 13, wherein said auxiliary guide means comprises:

a guide plate fixed to the upper edge of said second stage;

a support plate fixed to the other side of said slide member;

a guide roller rotatably mounted on said support plate and guided by said guide plate.

15. A disk changer as claimed in claim 14, further comprising means for adjusting the compressing force of said guide roller with respect to said guide plate.

16. A disk changer as claimed in claim 15, wherein said adjustment means comprises an adjustment screw threadably engaged with said support plate, having one end in contact with said slide member.

17. A disk changer as claimed in claim 11, wherein said fourth moving means comprises:

guide slots formed in said first and second extracting levers;

a plurality of guide pins formed on said slide member and coupled with said guide slots;

a fifth motor installed on said slide member;

a cam gear having a cam slot of a predetermined shape, mounted on said slide member, and rotated by said fifth motor;

a cam pin formed on said first extracting lever and coupled to said cam slot; and means for transmitting power from said fifth motor to said second extracting lever.

18. A disk changer as claimed in claim 17, wherein said transmitting means comprises:

fifth rack gear portions formed on ends of said first and second extracting levers, respectively; and a connecting gear rotatably mounted on said slide member for connecting said fifth rack gear portions of said first and second extracting levers.

19. A disk changer as claimed in claim 11, wherein arc-shaped grooves into which an edge of said one of said plurality of disks is partially inserted are formed in said first and second extracting levers, respectively.

20. A disk changer as claimed in claim 1, wherein said magazine portion comprises:

a disk storing member having a plurality of arc-shaped slits which are sequentially stacked, into which said plurality of disks are inserted; each said slit comprising:
 a pair of gripping levers, for gripping an edge of one of said plurality of disks, rotatably mounted on said disk storing member at said slit; and
 a pair of spring members for elastically biasing said pair of gripping levers toward the center of said one of said plurality of disks.

21. A disk changer as claimed in claim 20, wherein arc-shaped grooves into which the edge of said one of said plurality of disks is partially inserted are formed in said pairs of gripping levers, respectively.

22. A disk changer as claimed in claim 20, said disk storing member further comprising a plurality of supporting slots for supporting said plurality of disks, partially formed at each slit, respectively, into which said plurality of disks are respectively partially inserted.

23. A disk changer as claimed in claim 20, further comprising means for detecting the location of each of said plurality of disks in said magazine portion.

24. A disk changer as claimed in claim 23, wherein said detecting means comprises a sensor member fixed to said first stage, and wherein said detecting means counts the number of said slits of said disk storing member while said sensor member moves together with said first stage, thereby detecting the location of a selected disk.

25. A disk changer as claimed in claim 1, further comprising means for detecting the location of each of said plurality of disks stored in said magazine portion.

26. A disk changer as claimed in claim 1, wherein said recording/reproducing element is an optical pickup.

* * * * *